Nov. 17, 1925.

H. B. McCAINE

DIRECTION INDICATOR

Filed Aug. 1, 1924

1,561,989

H. B. McCaine,
Inventor

By Clarence A. O'Brien
Attorney

Patented Nov. 17, 1925.

1,561,989

UNITED STATES PATENT OFFICE.

HARRY B. McCAINE, OF ATLANTIC CITY, NEW JERSEY.

DIRECTION INDICATOR.

Application filed August 1, 1924. Serial No. 729,554.

*To all whom it may concern:*

Be it known that I, HARRY B. MCCAINE, a citizen of the United States, residing at Atlantic City, in the county of Atlantic and State of New Jersey, have invented certain new and useful Improvements in a Direction Indicator, of which the following is a specification.

This invention relates to an improved direction indicator of the type used upon automobiles for indicating the intention of a driver to pedestrians and on-coming automobile drivers.

It is my object to provide a direction indicator which may be automatically operated through the medium of the steering mechanism of the automobile so that the driver of the machine in the rear may ascertain without mistake whether or not the machine carrying the signal is to travel straight ahead or to make a turn to the right or left.

More specifically speaking, I propose to provide front and rear signals which are directly connected with the transverse rod of the steering gear so that the signals will be simultaneously operated.

It is also a feature of the invention to provide a signal which includes an automatically illuminated head, preferably of red glass, wherein this head is provided with openings through which rays of artificial light are displayed onto a highly polished arrow with which the head is provided, thus making the signal effective not only in daylight, but at night also.

The invention embodies features of construction and these will become apparent from the following description and drawing.

In the accompanying drawing forming a part of this application and in which like numerals are employed to designate like parts throughout the same:

Figures 1, 2, 3, 4:
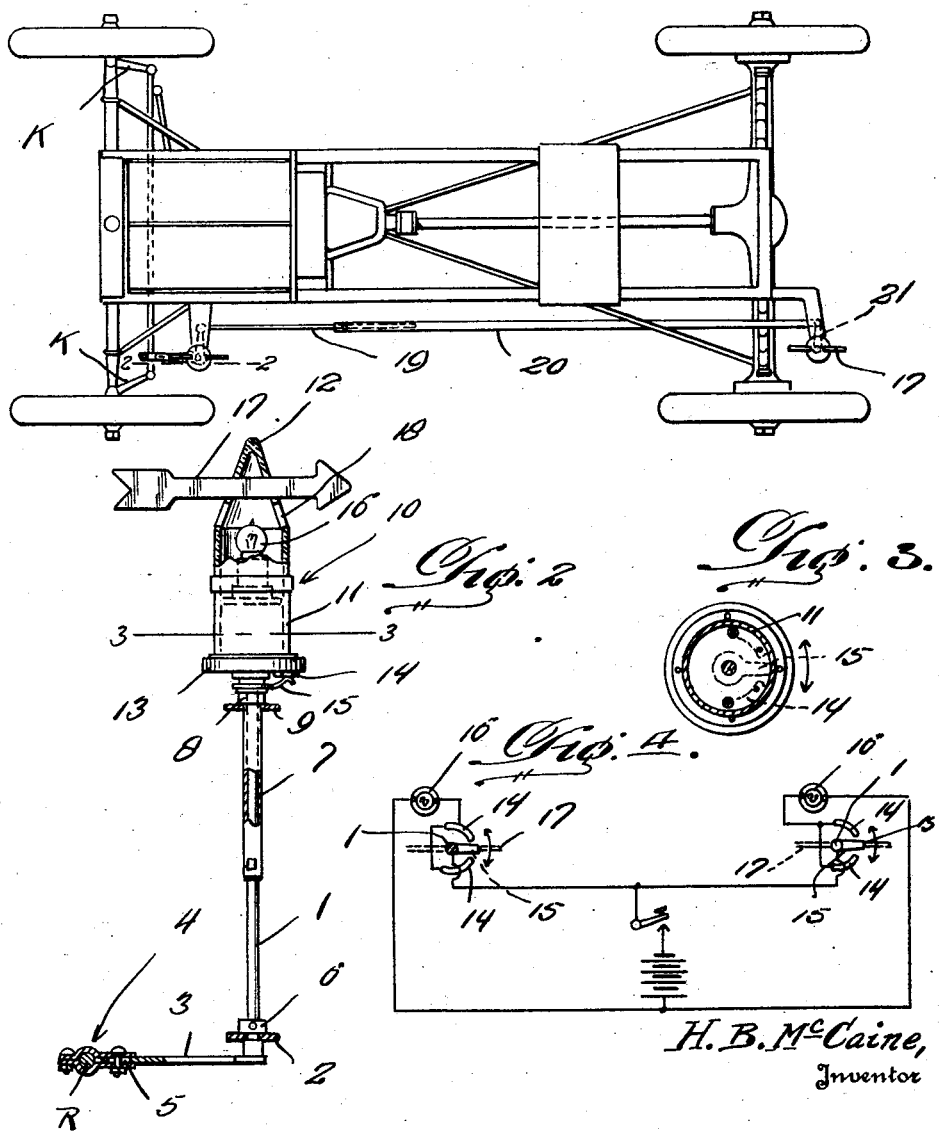
Figure 1 is a top plan view of the running gear of a conventional automobile showing the same equipped with a direction indicator constructed in accordance with the present invention.
Figure 2 is an enlarged view, partly in section and elevation, showing the major detail of the present invention.
Figure 3 is a transverse section taken on the line 3—3 of Figure 2.
Figure 4 is a top plan diagrammatic view of the circuit wiring.

As before intimated, the invention embodies a front and rear signal and inasmuch as these are of duplicate construction, I shall describe but one signal, it being understood the singular terms refer to like parts of both signals. To this end, the improved signal comprises a vertically disposed rod 1 rotatably mounted at its lower end in a suitable bearing opening in a support 2. The support may be a supplemental bracket if desired. Connected to the lower end of the rod 1 and extending forwardly therefrom is a crank arm 3, and the free end of which is a suitable clamp 4 adapted to be connected with the cross rod R between the steering knuckle arms K. A suitable loose connection is provided at 5 to permit the necessary relative movement between the clamps and the arm 3. Adjacent the supporting bracket 2 and secured to the rod in any suitable way is a second and smaller crank arm 6 which serves a purpose to be hereinafter described. The upper end of the rod 1 telescopes into a relatively stationary blade 7 which is provided at its upper end with a head or collar 8 adapted to rest upon one of the front fenders or other convenient supporting member 9. The rod 1 extends through and beyond the sleeve 7 and at its upper end it is equipped with a direction indicating head generally designated by the reference character 10. The head is made up of a lower non-transparent half 11 and an upper glass half 12. The upper half may be of red glass and preferably embodies a conical end as shown. The base 13 of the head is provided on its under side with spaced arcuate contacts 14 which are adapted to coact with relatively stationary contacts 15 disposed adjacent thereto. An electric bulb or its equivalent 16 carried by the head is disposed within the transparent upper half 12. In order that rays of light may pass through the part 12 to illuminate the arrow 17 carried thereby, I provide the part 12 with a plurality of slots 18. Though it will be seen that in addition to illuminating the red glass part 12, the bulb 16 serves to cast light rays onto the silvered arrow 17 so that it may be readily seen. Connected to the aforesaid small crank arm 6 is a rod 19 which telescopes into a tube 20, the latter being connected to a crank arm 21 on the lower end of the rear signal. With this arrangement it is obvious that the motion given the front signal which will be transmitted to the rear signal and in order to connect the parts 19 and 20 in set relation, a set screw or the like may be provided as shown. In operation, it will be seen that as the rod R moves transversely of the machine with the movement of the front wheel, a corresponding movement will be imparted to the arm 3 through the medium of the clamp 4. The arm 3 will in turn rotate the rod or shaft 1 and the signal head 10 on the upper end thereof will be rotated with this rod. The arrow carried by the head will indicate the direction of the turn being made by the vehicle carrying the signalling device. Simultaneously with the rotation of the head, the switch made up of the contacts 14 and 15 will operate to illuminate the bulb 16. White rays of light will escape through the slots 18 to render the arrow 17 clearly visible. Simultaneously, the upper half 12 of the head will be illuminated to attract attention to the signal. Thus, the driver of an approaching machine may readily determine the direction of movement of the preceding vehicle.

In Figure 4 I have merely shown a diagrammatic view of the wiring which I propose to use. Since this does not enter into the invention, it need not be specifically described, but like reference characters designate the parts of the invention already described.

It is thought that the foregoing description taken in connection with the drawing will enable persons skilled in the art to which the invention relates to obtain a clear understanding of the same. For this reason, a more lengthy description is deemed unnecessary.

While I have shown and described the preferred embodiment of the invention, it is to be understood that minor changes coming within the scope of the adjoined claim may be resorted to if desired.

Having thus described the invention, what I claim is:—

An automobile indicator comprising a vertically disposed rotary shaft, an indicator head on the upper end of said shaft including a transparent housing, said housing being provided with slots, a light within the housing, the rays of light being adapted to pass through said slots, an indicating arrow carried by said housing and disposed within said slots, to permit the light rays to project therethrough and impinge upon said arrow, a laterally disposed crank arm connected rigidly to the lower end of the shaft for imparting motion to the latter, and a clamp carried by the free end of the arm and adapted to be connected to a part of the automobile steering gear.

In testimony whereof I affix my signature.

HARRY B. McCAINE.